United States Patent
Browne et al.

(10) Patent No.: US 8,190,545 B2
(45) Date of Patent: May 29, 2012

(54) METHOD AND APPARATUS FOR ADDING SKILLS TO A DATABASE OF SKILLS BY DETERMING IF NEW ISSUES ARE SIMILAR PREVIOUS ISSUES THAT WERE RESOLVED

(75) Inventors: Michael E. Browne, Staatsburg, NY (US); Carole A. Jannak, Austin, TX (US); Sandra K. Johnson, Cary, NC (US); Colin James Parris, Brookfield, CT (US); Katherine June Pearsall, Georgetown, TX (US); Bernadette Marie Wing, Austin, TX (US); Rudolph John Younger, III, Staatsbury, NY (US)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 12/353,378

(22) Filed: Jan. 14, 2009

(65) Prior Publication Data
US 2010/0179931 A1    Jul. 15, 2010

(51) Int. Cl.
*G06F 17/00* (2006.01)
(52) U.S. Cl. ........................................ 706/45
(58) Field of Classification Search ............ 706/12, 706/45
See application file for complete search history.

(56) References Cited

U.S. PATENT DOCUMENTS

| | | | |
|---|---|---|---|
| 7,003,502 B1 | 2/2006 | Wizdo et al. | |
| 7,593,904 B1 * | 9/2009 | Kirshenbaum et al. | 706/12 |
| 2002/0019870 A1 * | 2/2002 | Chirashnya et al. | 709/224 |
| 2002/0077884 A1 | 6/2002 | Sketch | |
| 2004/0095378 A1 | 5/2004 | Vigue et al. | |
| 2005/0028033 A1 * | 2/2005 | Kipersztok et al. | 714/27 |
| 2005/0114203 A1 | 5/2005 | Savitsky et al. | |
| 2005/0197992 A1 * | 9/2005 | Kipersztok et al. | 706/50 |
| 2007/0190503 A1 | 8/2007 | Yeramyan et al. | |
| 2008/0059292 A1 | 3/2008 | Myers et al. | |
| 2008/0091498 A1 | 4/2008 | Chiverton et al. | |
| 2008/0189149 A1 | 8/2008 | Carrillo et al. | |

OTHER PUBLICATIONS

Trice et al., Consensus Knowledge Acquistion, 1989, MIT A.I. Memo No. 1183, pp. 1-25.*

Kipersztok et al., Evidence-based Bayesian Networks Approach to Airplane Maintenance, 2002, IEEE, pp. 2287-2891.*

(Continued)

*Primary Examiner* — David Vincent
(74) *Attorney, Agent, or Firm* — Yee & Associates, P.C.; Steven L. Bennett

(57) ABSTRACT

A system thinker application receives a first issue, a first resolution to the first issue, and a first plurality of skills. The system thinker application searches a system environment electronic profile for a second issue, a second resolution to the second issue, and a second plurality of skills, wherein the system environment electronic profile contains a plurality of component profiles, and wherein the plurality of component profiles contain a second issue, a second resolution to the second issue, and a second plurality of skills. The system thinker application determines if the first issue, the first resolution to the first issue, and any one of the first plurality of skills are similar to any one of the second issue, the second resolution to the second issue, and any one of the second plurality of skills. The system thinker application adds skills to the system environment electronic profile and the component profile.

6 Claims, 3 Drawing Sheets

OTHER PUBLICATIONS

"Working in partnership: developing a whole systems approach—Good practice guide" NHS Public Services Productivity Panel, U.K., Mar. 2000, pp. 1-24.

Castka et al., "Benchmarking intangible assets: enhancing teamwork performance using self-assessment", Benchmarking: An International Journal, vol. 11, No. 6, 2004, pp. 571-583.

Karkkainen et al., "Decision making in inter-organisational relationships: implications from systems thinking", International Journal Technology Management, vol. 33, Nos. 2/3, 2006, pp. 144-159.

Leonard et al., "Impacting organizational learning: the training and experiences of quality award examiners and assessors", Journal of European Industrial Training, 27/1 (2003), pp. 16-21.

* cited by examiner

US 8,190,545 B2

METHOD AND APPARATUS FOR ADDING SKILLS TO A DATABASE OF SKILLS BY DETERMING IF NEW ISSUES ARE SIMILAR PREVIOUS ISSUES THAT WERE RESOLVED

BACKGROUND OF THE INVENTION

1. Field of the Invention

The present invention relates generally to developing system thinkers. Still more particularly, the present invention relates to dynamically updating system thinkers skills.

2. Description of the Related Art

The concept of "cognitive thinking" is not new. Essential to the theory importance to understand the reasoning behind arriving at an answer over the correctness of the answer. Important to this concept is the idea of adaptation. With respect to human beings this means that one has to adapt successfully to one's environment in order to survive. Two key processes in adaptation are assimilation and accommodation. In assimilation, knowledge is taken in, and in accommodation, that knowledge is acted upon. An extension of this "cognitive thinking" process appears to be emerging in industry today as a new "organizational learning" process that is called "system thinking". System thinking is the art of seeing things as a whole and is the practice of focusing on the relationship among the parts of the system. Currently, too many bits and pieces of disjointed methods, techniques and tools are available for those interested in this process.

BRIEF SUMMARY OF THE INVENTION

The illustrative embodiments described herein provide a computer-implemented method, apparatus, and computer program product for dynamically updating system thinker skills. The system thinker application receives a first issue, a first resolution to the first issue, and a first plurality of skills. The system thinker application searches a system environment electronic profile for a second issue, a second resolution to the second issue, and a second plurality of skills, wherein the system environment electronic profile contains a plurality of component profiles, and wherein the plurality of component profiles contain a second issue, a second resolution to the second issue, and a second plurality of skills. The system thinker application determines if the first issue, the first resolution to the first issue, and any one of the first plurality of skills are similar to any one of the second issue, the second resolution to the second issue, and any one of the second plurality of skills. The system thinker application adds skills to the system environment electronic profile and the component profile.

BRIEF DESCRIPTION OF THE SEVERAL VIEWS OF THE DRAWINGS

The novel features believed characteristic of the illustrative embodiments are set forth in the appended claims. The illustrative embodiments, themselves, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE INVENTION

Figure 1:
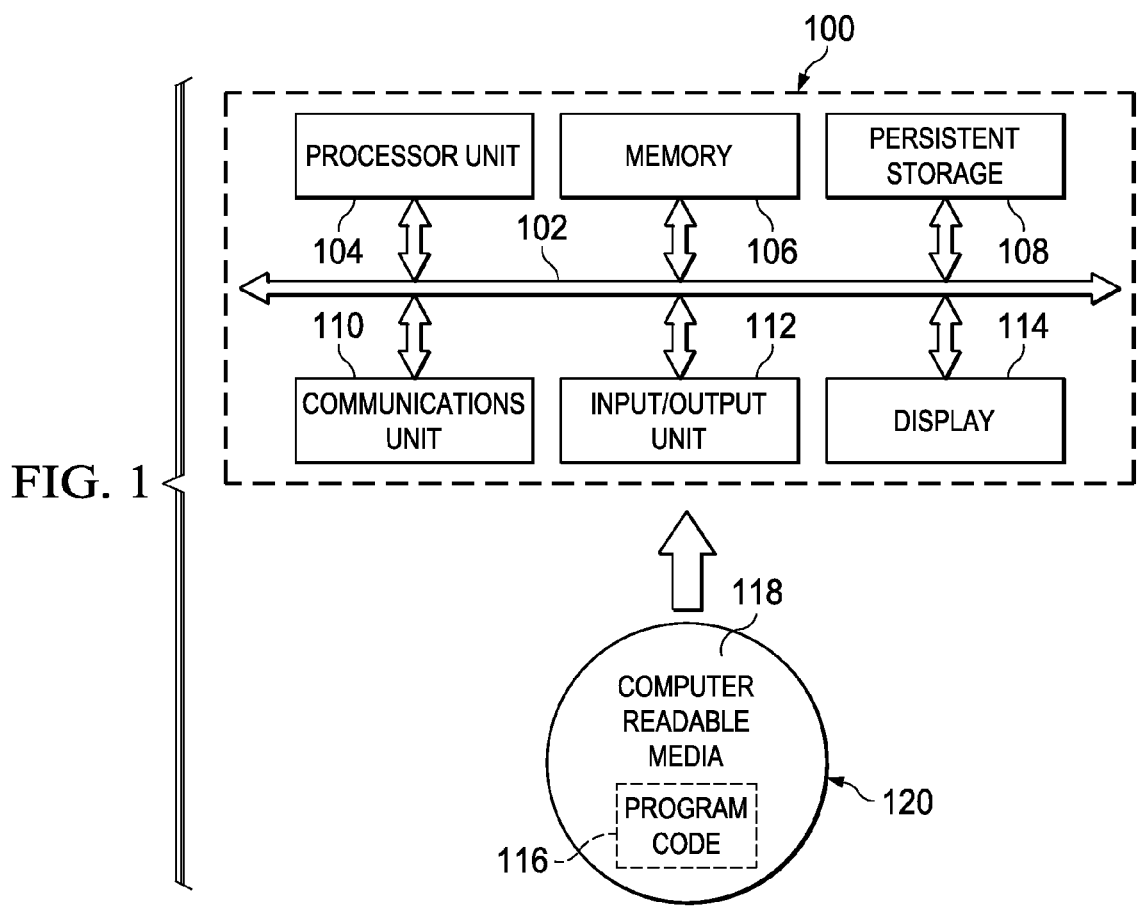
FIG. 1 is a diagram of a data processing system depicted in accordance with an illustrative embodiment of which the present invention may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The system thinker application receives a first issue, a first resolution to the first issue, and a first plurality of skills. The system thinker application searches a system environment electronic profile for a second issue, a second resolution to the second issue, and a second plurality of skills, wherein the system environment electronic profile contains a plurality of component profiles, and wherein the plurality of component profiles contain a second issue, a second resolution to the second issue, and a second plurality of skills. The system thinker application determines if the first issue, the first resolution to the first issue, and any one of the first plurality of skills are similar to any one of the second issue, the second resolution to the second issue, and any one of the second plurality of skills. The system thinker application adds skills to the system environment electronic profile and the component profile.

FIG. 1 is a diagram of a data processing system depicted in accordance with an illustrative embodiment of which the present invention may be implemented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 116 may be a server computer, a client computer, or some other device capable of storing and transmitting program code 116.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The system thinker application receives a first issue, a first resolution to the first issue, and a first plurality of skills. The system thinker application searches a system environment electronic profile for a second issue, a second resolution to the second issue, and a second plurality of skills, wherein the system environment electronic profile contains a plurality of component profiles, and wherein the plurality of component profiles contain a second issue, a second resolution to the second issue, and a second plurality of skills. The system thinker application determines if the first issue, the first resolution to the first issue, and any one of the first plurality of skills are similar to any one of the second issue, the second resolution to the second issue, and any one of the second plurality of skills. The system thinker application adds skills to the system environment electronic profile and the component profile.

Figure 2:
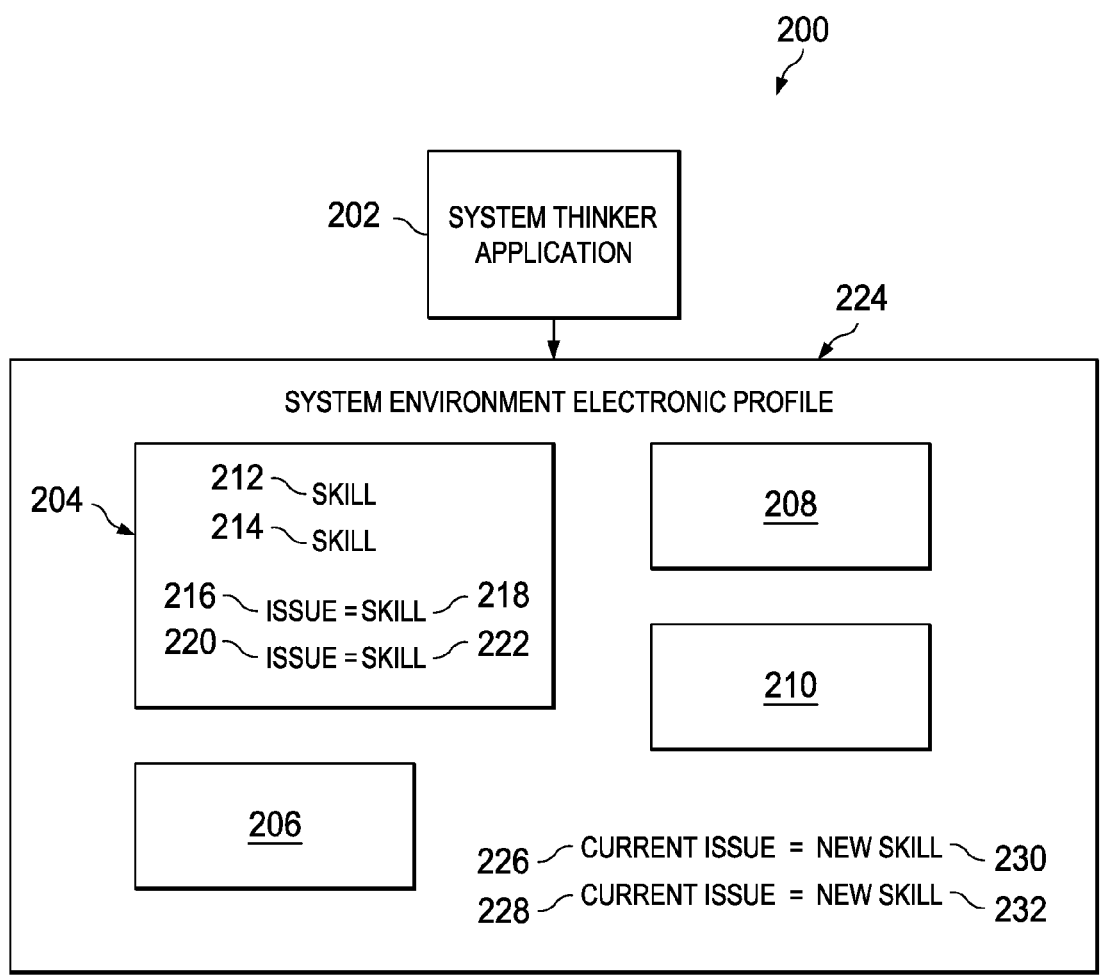
FIG. 2 is a block diagram of a systems thinker application and an instruction sequencing unit, in which the illustrative embodiments of the present invention may be implemented.

FIG. 2 is a block diagram of system thinking environment 200 is depicted in accordance with an illustrative embodiment. System thinking environment 200 may be implemented in a data processing system such as data processing system 100 in FIG. 1. In some illustrative embodiments system thinking environment 200 may be implemented on more than one data processing system.

System thinking environment 200 includes system thinker application 202, component profile 204, and system environment electronic profile 206 in this illustrative embodiment. System thinker application 202 may operate on a processor such as processor unit 104 in FIG. 1. Component profiles 204, 206, 208, and 210 and system environment electronic profile 224 can be stored in storage such as memory 106 in FIG. 1, persistent storage 108 in FIG. 1, or any other type of storage.

Component profiles 204, 206, 208, and 210 can be, for example, a profile for a person in a company. Component profiles 204, 206, 208, and 210 can contain data on a variety of skills 212 and 214 associated with that person. The person can be of any level in the company such as a president or a technician. Component profiles 204, 206, 208, and 210 can also contain all of the issues 216 and 220 which the person associated with that profile has previously resolved and which skills 218 and 222 that person has developed.

System environment electronic profile 224 can contain component profile 204, 206, 208, and 210. System environment electronic profile 224 can also contain current issues 226 and 228 in the environment.

System thinker application 202 can, for example, compare current issues 226 and 228 with issues 216 and 220 in component profiles 204. If there is a match then a user may look to see which skills were used to resolve those issues. If there is not a match then system thinker application 202 can create a new skill 230 and 232. Once the skills 218 and 222 or new skills 230 and 232 needed to resolve the issues are found, they can be added to the system environment electronic profile 224 and component profile 204, 206, 208, and 210 for the user.

Figure 3:
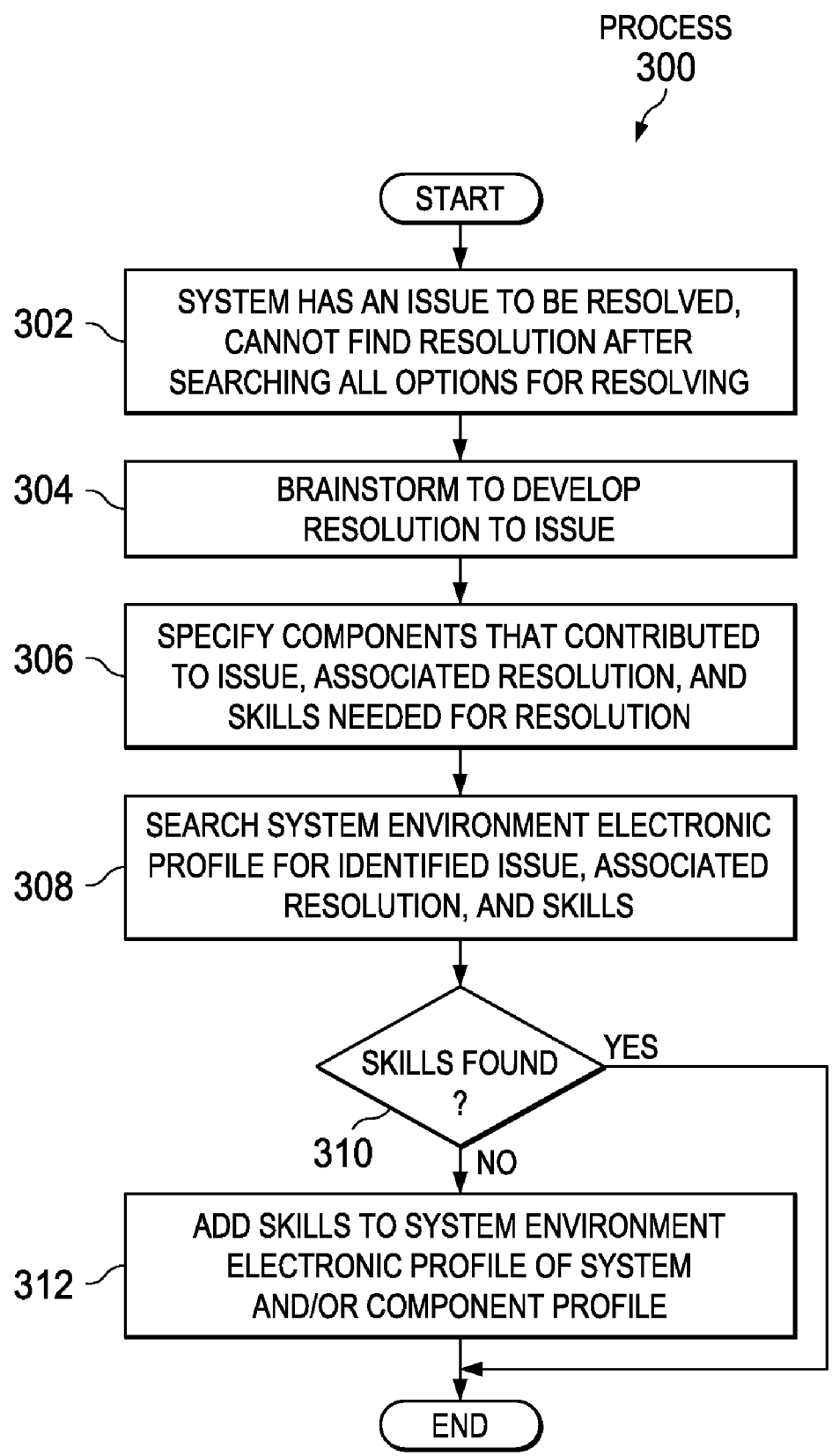
FIG. 3 is a flowchart of a process for dynamically updating systems thinker skills, in accordance with an illustrative embodiment of the present invention.

FIG. 3 is a flowchart of a process for dynamically updating system thinker skills, in accordance with an illustrative embodiment The process 300 begins when a user encounters an issue and the user does not have the skills needed to resolve the issue (step 302). "Issue" and "problem" are interchangeable. Process 300 can occur on the system thinker application 202 and the system environment electronic profile 224 of FIG. 2.

The user will then brainstorm to develop a resolution to the issue (step 304). For example, if a chemist has a problem with the yield of the plant and is instructed by his superiors that he needs to increase the yield of the plant, he may first look at statistical process controls. Then he might make sure everything is operating the way it's supposed to operate, and finally look to see if something has changed. If something has changed and it is related to materials engineering, then he will look to see if he has that skill. If he does not have the skill, then he will brainstorm to determine what he needs to come up with for the resolution. While brainstorming, the user determines that he needs to know some information about the chemical properties of the material to resolve the issue. While the user may be a chemist, he may not have the exact skills needed to resolve this particular issue.

Next, the user will enter into the system thinker application the system and components in that system that contributed to the issue, the resolution, and the skills needed for the resolution (step 306). Then, the system thinker application will search the system environment electronic profile and the component profiles in the system environment electronic profile for similar issues and skills and elements needed to resolve the issue (step 308). The search may use a relevancy checker.

The system thinker application then determines if the skill and issues were found (step 310). If similar skills and/or issues are found, the process terminates. If no similar skills or issues are found then the user must get those skills. For example, the chemist could get educated on the area of chemistry that he needs to resolve the issue. Once the user has obtained the skills needed to resolve the issue, the skills are added to the user's component profile and the system environment electronic profile (step 312).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The system thinker application receives a first issue, a first resolution to the first issue, and a first plurality of skills. The system thinker application searches a system environment electronic profile for a second issue, a second resolution to the second issue, and a second plurality of skills, wherein the system environment electronic profile contains a plurality of component profiles, and wherein the plurality of component profiles contain a second issue, a second resolution to the second issue, and a second plurality of skills. The system thinker application determines if the first issue, the first resolution to the first issue, and any one of the first plurality of skills are similar to any one of the second issue, the second resolution to the second issue, and any one of the second plurality of skills. The system thinker application adds skills to the system environment electronic profile and the component profile.

In an illustrative embodiment, the system thinking environment can provide a single system, methodology, and media that can serve as an organizational learning tool to teach our technical leaders a new way of "thinking through and solving" problems. In an illustrative embodiment the system thinking environment can identify critical issues within an organization that impact performance and direct a user to identify all relationship among the parts of the issue. Eventually the user can lead him/her to defining a level of complexity for the problem under investigation.

In an illustrative embodiment, the system thinking environment can force a self assessment of a user with respect to typical attributes usually required to handle a problem of this complexity. The system thinking environment can highlight required skills necessary to solve problems under investigation. The system thinking environment can set direction and strategy by providing enablers to overcome barriers and inhibitors via a "whole system" approach.

In an illustrative embodiment, the system thinking environment can establish learning models to overcome each known barrier. The system thinking environment can allow for storing of new solving techniques learned through this process. Storing can be by a feedback loop that stores the new learning then updates modules to include new ways to overcome new barriers. The system thinking environment can provide detailed roadmaps for development of "system thinkers."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The system thinker application receives a first issue, a first resolution to the first issue, and a first plurality of skills. The system thinker application searches a system environment electronic profile for a second issue, a second resolution to the second issue, and a second plurality of skills, wherein the system environment electronic profile contains a plurality of component profiles, and wherein the plurality of component profiles contain a second issue, a second resolution to the second issue, and a second plurality of skills. The system thinker application determines if the first issue, the first resolution to the first issue, and any one of the first plurality of skills are similar to any one of the second issue, the second resolution to the second issue, and any one of the second plurality of skills. The system thinker application adds skills to the system environment electronic profile and the component profile.

What is claimed is:

1. A computer-implemented method for development of system thinkers, the computer-implemented method comprising:
   receiving, by a processor unit, a first issue, a first resolution to the first issue, and a first plurality of skills;
   searching, by the processor unit, a system environment electronic profile for a second issue similar to the first issue, a second resolution to the second issue similar to the first resolution, and a second plurality of skills similar to the first plurality of skills, wherein the system environment electronic profile contains a plurality of component profiles, and wherein the plurality of component profiles contain the second issue, the second resolution to the second issue, and the second plurality of skills;
   determining, by the processor unit, that no second issue similar to the first issue exists, that no second resolution similar to the first resolution exists, and that no second plurality of skills similar to the first plurality of skills exists; and
   adding, by the processor unit, any new skills to resolve the first issue to the system environment electronic profile and the component profile responsive to not finding the existence of the similar second issue, second resolution, or similar skill.

2. The computer-implemented method of claim 1 wherein searching, by the processor unit, is done using a relevancy checker.

3. An apparatus comprising:
   a bus system;
   a memory connected to the bus system;
   a system thinker application, wherein the system thinker application receives a first issue, a first resolution to the first issue, and a first plurality of skills, wherein the system thinker application searches a system environment electronic profile for a second issue similar to the first issue, a second resolution to the second issue similar to the first resolution, and a second plurality of skills similar to the first plurality of skills, wherein the system thinker application determines that no second issue similar to the first issue exists, that no second resolution similar to the first resolution exists, and that no second plurality of skills similar to the first plurality of skills exists, and wherein the system thinker application adds any new skills to resolve the first issue to the system environment electronic profile and a component profile responsive to not finding the existence of the similar second issue, second resolution, or similar skill; and
   wherein the system environment electronic profile contains the plurality of component profiles, and wherein the plurality of component profiles contain the second issue, the second resolution to the second issue, and the second plurality of skills.

4. The apparatus of claim 3 wherein the system thinker application searches using a relevancy checker.

5. A computer program product in a computer readable medium for developing system thinkers, the computer program product comprising:
   program code, stored on a tangible computer readable media, for receiving a first issue, a first resolution to the first issue, and a first plurality of skills;
   program code, stored on the tangible computer readable media, for searching a system environment electronic profile for a second issue similar to the first issue, a second resolution to the second issue similar to the first resolution, and a second plurality of skills similar to the first plurality of skills, wherein the system environment electronic profile contains a plurality of component profiles, and wherein the plurality of component profiles contain the second issue, the second resolution to the second issue, and the second plurality of skills;
   program code, stored on the tangible computer readable media, for determining that no second issue similar to the first issue exist, that no second resolution similar to the first resolution exist, and that no second plurality of skills similar to the first plurality of skills exist; and
   program code, stored on the tangible computer readable media, for adding any new skills to resolve the first issue to the system environment electronic profile and the component profile responsive to not finding the existence of the similar second issue, second resolution, or similar skill.

6. The computer program product of claim 5 wherein searching is done using a relevancy checker.

* * * * *